United States Patent
Bock et al.

(10) Patent No.: US 6,220,761 B1
(45) Date of Patent: Apr. 24, 2001

(54) BEARING ARRANGEMENT WITH COOLING GROOVE FOR AN OPEN-END SPIN ROTOR USING SUPPORT DISKS

(75) Inventors: Erich Bock, Wettstetten; Manfred Knabel; Edmund Schuller, both of Ingolstadt, all of (DE)

(73) Assignee: Rieter Ingolstadt Spinnereimaschinenbau AG, Ingolstadt (DE)

( * ) Notice: Subject to any disclaimer, the term of this patent is extended or adjusted under 35 U.S.C. 154(b) by 0 days.

(21) Appl. No.: 09/323,187

(22) Filed: May 27, 1999

(30) Foreign Application Priority Data

May 29, 1998 (DE) .............................. 198 24 286

(51) Int. Cl.⁷ .............................. F16C 13/00; D01H 1/24
(52) U.S. Cl. .............................. 384/549; 57/406
(58) Field of Search .................. 57/78, 92, 103, 57/104, 400, 401, 404, 406, 407; 384/549

(56) References Cited

U.S. PATENT DOCUMENTS

| | | |
|---|---|---|
| 3,779,620 | 12/1973 | Stahlecker . |
| 3,873,886 | 3/1975 | Kato et al. . |
| 4,020,710 * | 5/1977 | Gassner et al. ............... 57/103 X |
| 4,149,365 * | 4/1979 | Kobayashi et al. ................... 57/104 |
| 4,785,620 | 11/1988 | Feuchter ................... 57/406 |
| 4,896,976 | 1/1990 | Stahlecker et al. ................... 384/549 |
| 4,916,891 | 4/1990 | Landwehrkamp et al. ........... 57/406 |
| 5,178,473 | 1/1993 | Oexler et al. ................... 384/549 |
| 5,551,226 | 9/1996 | Keir et al. ................... 57/406 |
| 5,736,603 | 4/1998 | Pfeiffer ................... 524/495 |
| 5,904,038 * | 5/1999 | Stahlecker ................... 57/406 |
| 5,992,137 * | 11/1999 | Wuest ................... 57/406 |
| 6,033,121 * | 3/2000 | Stahlecker ................... 384/549 |

FOREIGN PATENT DOCUMENTS

| | | |
|---|---|---|
| 4024268A1 | 2/1992 | (DE) . |
| 4218173A1 | 12/1992 | (DE) . |
| 19549466A1 | 6/1997 | (DE) . |

* cited by examiner

Primary Examiner—Thomas R. Hannon
(74) Attorney, Agent, or Firm—Dority & Manning

(57) ABSTRACT

For a bearing arrangement of an open-end spin rotor, which is rotatably set in the "V" between circumferential rims of support disks, one or more of the support disks (14), which bear the open-end spin rotor, has a circumferential cleaning groove (3). The cleaning groove (3) can be a self closing, endless groove, which runs over the contact surface of the support disk (14), wherein it generally does not run parallel to the edges of the support disk (14). Such a meandering groove formulation of the support disk circumference assures that no deposits of impurities can accumulate on the rotor shaft.

31 Claims, 4 Drawing Sheets

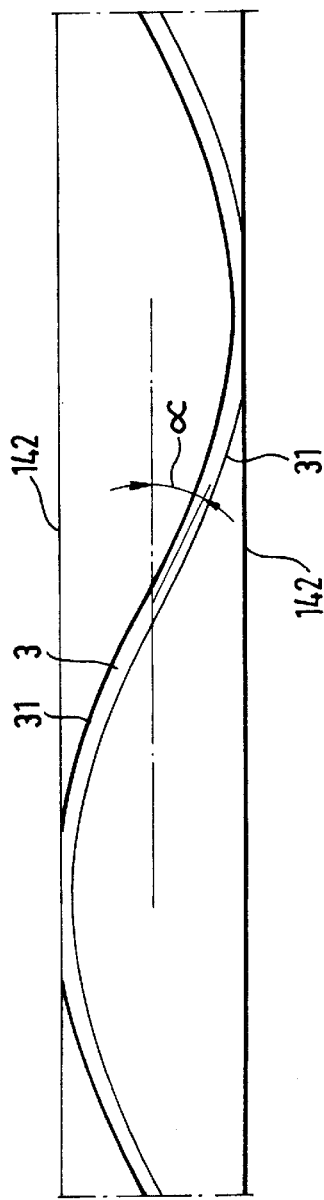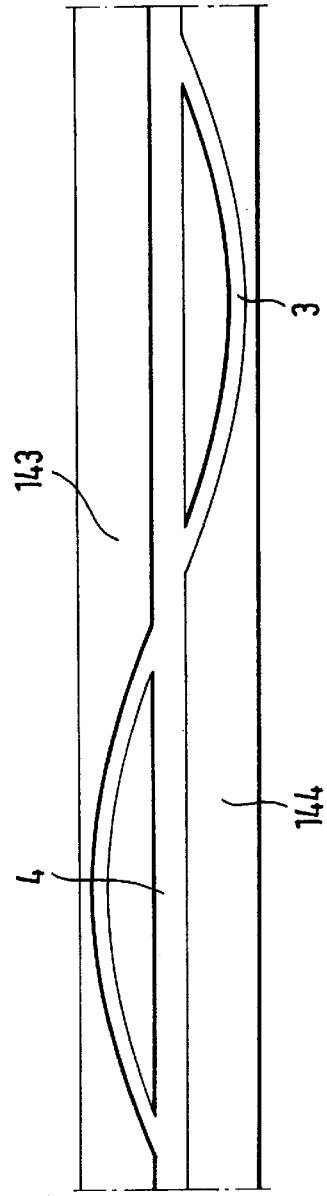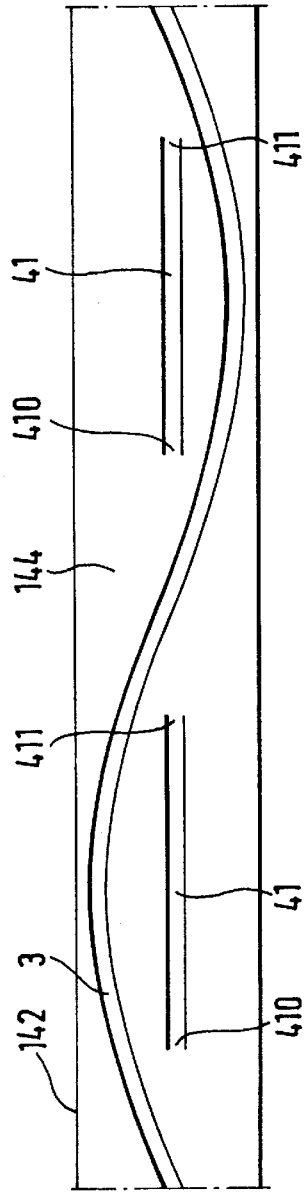

BEARING ARRANGEMENT WITH COOLING GROOVE FOR AN OPEN-END SPIN ROTOR USING SUPPORT DISKS

BACKGROUND

The present invention concerns a bearing for an open-end spin rotor wherein the shaft of the spin rotor is carried on support disks, wherein a support disk is comprised of a basic body upon which a ringlike, circumferential rim is placed which forms the contact surface for the spin rotor. Common knowledge includes a bearing for an open-end spin rotor wherein a shaft is held by means of supporting disks. In this method, as a rule, two pairs of support disks are installed, in the V-notch between which the shaft of the spin rotor is so placed, that one pair of supporting disks serves as bearings in proximity to the rotor bowl, and the other pair performs a like service on the shaft end remote from said bowl. The surface of the shaft of the open-end spin rotor rotates with practically the same circumferential speed as the support disks. Likewise, the shaft of the open-end spin rotor is a driven shaft, wherein, between the two supporting pairs of disks, a tangential belt is placed which places the said shaft in rotation.

DE 37 34 545 A1 discloses a bearing for an open-end spin rotor. The support disks in this case are furnished with a cooling groove on their bearing contact surfaces, as is also proposed in U.S. Pat. No. 5,178,473 for applications of bearings for open-end spin rotors. A support disk is comprised of a basic body, upon which a contact surface rim is fitted. The said contact surface rim is comprised of plastic, whereby particularly favorable running characteristics are assured for the open-end spin rotor. This rim serves as a damping agent for the spin rotor during its operation as well as assuring a smooth run of the spinning machine. The rolling of the rotor shaft on the rim of a support disk generates heat to the extent that damage can arise. This damage is caused by the overheating of the support disk rims. To alleviate such heating, the U.S. Pat. No. 5,178,473 proposes other particular embodiments of the said rim, such as radiating ribs or a cooling groove in said rim of the supporting disk.

This cooling groove is used practically for all bearing applications for open-end rotor spinning machines, that is applications employing the support disks which are applied there.

DE 195 49 466 shows, in general, how the basic body of a support disk is constructed, so that a favorable connection can be brought about between the plastic rim of the disk and the basic disk body.

U.S. Pat. No. 5,551,226 makes known a support disk for a bearing for an open-end spin rotor, the rim of which is designed with ribbing, so that the rotor shaft rolls on a plurality of individual ribs. The outer side of the ribs, on which the rotor shaft rolls, forms essentially the contact surface for the rotor shaft of the spin rotor. The ribs are at an incline in relation to the middle line M of the rim, so that upon the rolling of the shaft of the spin rotor thereon, an axially acting force is exercised, which in turn braces itself against the reaction of a thrust bearing in the conventional manner.

Indeed, the appearance is given in this version of a support disk bearing that the removal of the heat which arises in the rim during operation of the support disk is excellent in all ways. However, the width of the rim in the area of the contact line with the rotor shaft is so weakened, that an overload of the rim is created. By means of the given conditions involved in a bearing selection for an open-end spin rotor, it is practically not possible to design a support disk wider, simply to compensate for this weakening of the carrying capacity of the support disk. The bearing shown in the U.S. Pat. No. 5,551,226 for an open-end spin rotor is only satisfactory within limits, that is, either the operational speed of rotation of the spin rotor or the tension of the drive belts must be reduced. In practice, such reduction could not be tolerated.

Open-end spinning machines run at the top speed of the open-end spin rotors, whereby rotation speeds of 150,000 RPM's are reached and this value can be considerably overstepped. The environment under which the support disks run is, in fact, very demanding. The processing of cotton, for instance, brings about a high generation of dust which surrounds the open-end spinning machine as well as the bearing for the open-end spin rotor.

This can lead to a state, in which contamination from the environment reacts in such a way with the bearings that during the running of the open-end spin rotor the said contamination accumulates on the shaft of said spin rotor in that area where the shaft contacts the support disks. This contamination is picked up from the ambient surroundings by the support disks and is then redeposited on the surface of the rotor shaft. These deposits can be so solidified that the rotation of the spin rotor can no longer be assured and operational disturbances, such as thread breakage, can come about. Field observations have led to the conclusion that the bearing disk rim, which is comprised of plastic, does not come into contact with the contamination by mechanical contact alone, but under certain circumstances develops an electrostatic charge during the operation and thereby attracts contamination onto its surface, from which this contamination spreads onto the rotor shaft.

The support disks operate between 10,000 and 20,000 RPM so that a high degree of friction develops between the rim and its surrounding air. The electrostatic loading of the rim also causes fines to collect on the surface of the support disk, which comes into contact with the rotor shaft. This contamination, as indicated above, carries over from the surface of the support disk to the rotor shaft, where, because of being subsequently constantly rolled on, the said contamination becomes a solid coating.

OBJECTS AND SUMMARY

Thus a principal purpose of the present invention is, therefore, to design a bearing for an open-end spin rotor in such a manner that the disadvantages of the state of the technology are avoided and a contamination of the rotor shaft, as well as the bearing contact rim of the support disk, is prevented. Additional objects and advantages of the invention will be set forth in the following description, or may be obvious from the description, or may be learned through practice of the invention.

The purposes will be achieved by the invention in accord with the inventive design of a bearing for an open-end spin rotor wherein the contact surface of the rim possesses at least one cleaning groove for the cleaning of the rotor shaft from accumulations of deposits and/or the shaft is provided with a cleaning groove, at least in its longitudinal section, with which said shaft coacts with the contact surface of the support disk.

The individual features of the embodiments according to the invention can be freely combined with one another and support one another in their action.

A decontamination of the rotor shaft is carried out by the design of the invented contact surface of the support disk, which surface possesses a cleaning groove. The cleaning groove causes a scraping action against the rolled-on deposit on the rotor shaft. That is to say, the cleaning groove takes care that the dirt accumulation on the rotor shaft doesn't form a cake in the first place. At the same time, the said groove provides that contaminations, which have already deposited themselves on the rotor shaft, are continuously removed without solidifying on said rotor shaft. A clean rotor shaft, at the same time, assures the cleanliness of that surface of the support disk rim with which the shaft contacts. The cleaning groove removes the contamination, especially the small dust particulate, so that a fault-free rolling of the rotor shaft on the contact rim of the support disk is possible. Thus, the bearing possesses, in an especially favorable embodiment, a support disk, the cleaning groove of which is designed to run at an angle to the middle line M of the support disk rim surface. What is achieved by this is that the edges of the cleaning groove thoroughly scrape the dirt particles away from the axial length of the rotor shaft. In a particularly advantageous embodiment, the cleaning groove is designed as a self-closing groove, so that this can be advantageously manufactured and at the same time, no impacts by the rolling over of the rotor shaft can occur. Such a closed groove has already proven itself in the case of a central cooling groove in the present state of the technology. In a particularly favorable development of the invention, the cleaning groove possesses a width between 0.2 mm and 2 mm. In a favorable development of the invention, the cleaning groove has a depth between 0.2 mm and 2 mm.

A simple scouring of contamination can be achieved by these favorable dimensions and thereby the said deposits can be removed from the rotor shaft and from the contact surface of the rim of the support disk. Further, the solidification of contamination in the cleaning groove can be prevented.

In a favorable development of the invention, a second cleaning groove is added paralleling a first groove. In this way, the entire relevant axial section of the shaft can be reliably cleaned by the cleaning grooves.

In this arrangement, it is possibly an advantage if one cleaning groove is located more in the area of the contact surface of the rim which is proximal to the spin rotor, while the other cleaning groove is found more on the side of the said contact surface, which is remote from the spin rotor. In the case of a favorable embodiment of the invention, a plurality of cleaning grooves are so placed that they are not parallel to one another, but cross each other, that is, in crisscross arrangement. Such an embodiment with two cleaning grooves is advantageous, because thereby both grooves can have a large angularity toward the middle line of the aforesaid contact surface.

In yet another development, provision is made that additionally a cooling groove is placed on the contact surface of the rim of the support disk. Thereby the achievement is made that the rim of the contact surface, in spite of a high load demand, is designed at a right angle to the axis of the groove running on the support disk rim surface and is placed advantageously centrally in the said rim surface. In another embodiment of the invention, the cooling groove is an endless groove, which is placed midway on the circumference of the support disk. In a further embodiment, the contact surface of the rim of the support disk possesses, besides the cleaning groove, additional incisions running essentially at a right angle to the support disk axis, with the advantage that large, wide rim areas are avoided. Large material accumulations on the rim can lead to storage of heat arising from the rolling of the rotor shaft on the rim surface.

In yet another advantageous embodiment of the invention, the support disk possesses on its contact surface, in the area of one or both sides, an uninterrupted run of circumferential surface. By this means, it is achieved that no impact points arise during the rolling of the rotor shaft over the contact surface. The contact surface is, in the edge area, not interrupted. In the case of a favorable development of the invention, at least one of the edges of the cleaning groove does run over the side of the contact surface of the support disk. The advantage of this is that only a small impact point upon the rolling of the rotor shaft on the contact surface occurs.

In spite of this, the cleaning groove, as seen in an axial direction of the rotor shaft, has an optimal run all the way to the edge of the support disk, so that an especially good cleaning action is achieved. Thus there is only a small portion of the rotor shaft, in its relevant area, which is not acted upon by the cleaning groove. By a further advantageous development of the invention, both sides of the cleaning groove run out over both sides of the contact surface, whereby the entire axial length of the rotor shaft, which contacts with the support disk, is scraped over and is thereby cleaned.

In another advantageous embodiment of the invention, it is provided that the contact surface of the rim of the support disk, seen in an axial direction, is interrupted by at least up to 40% by a cooling groove and/or cleaning groove. This assures that a contact line always remains between the rotor shaft and the support disk. This is particularly of advantage in order to reach a high operational life of the support disk. The surface pressure is reduced to the lowest possible level. In a favorable development of the invention, the bearing possesses a support disk which has a cleaning groove, the contact surface of which support disk, seen from an axial direction, is interrupted between 7% and at the most 25%. That is, the contact line of the rotor shaft with the contact surface is only diminished by 7% to 25% at the most. This is in comparison to a groove-free support disk. In an advantageous manner, again seen from an axial direction, the contact surface is, at the most, interrupted by three grooves.

In a favorable development of the invention, the basic body of the support disk has a recess which matches the course of the cleaning groove. This assures that the radial thickness of the rim, between the basic body and the cleaning groove, remains approximately constant. Thus, for the elastic compression of the rotor shaft into the rim of the support disk, there are always constant conditions present because the thickness of the rim is always constant at each location. In another development of the invention, the cleaning groove possesses a U-shaped profile. This takes care that the sides of the groove can be particularly of special sharpness, whereby a better cleaning action is achieved. In another embodiment of the invention, the cleaning groove possesses a V-shaped profile. This can be produced very easily.

An advantageous result is obtained through an embodiment of the invention in which the rim of the support disk is comprised of plastic and, at least in the area of the contact surface, the said surface has an electrical resistance which is less than $1.0 \times 10^9$ Ohms. Because of this, the contact surface of the support disk develops so little static electrical charge that less contamination from the surroundings is drawn to it. Beyond this, the achievement has been arrived at that the electrical charges which act upon the contamination particles have less force than the centrifugal forces which work against them. The centrifugal force which acts upon the dust particles is a result of the rotation of the support disk, hence diameter and speed of rotation of the support disk are to be taken into consideration when the electrical resistance of the rim is designed. The value of $1.0\times10^9$ Ohms has shown itself, on the average, as an advantageous value, which has proven itself in the conventional support disk diameters and their speed of rotation. At the same time, it is possible, in spite of the declining electrical resistance, to construct the disk rim with favorable material characteristics. Additives, which lead to a lowering of the electrical resistance of the contact surface, can, in some cases, unfavorably affect the mechanical characteristics of the rim. A complete reduction of the resistance of the rim, is, on this account, indeed theoretically very desirable. However, this could be achieved only with high costs or with a degrading of the material characteristics of the rim of the support disk. A value of less than $3.5\times10^5$ Ohms has shown itself as advantageous for the electrical resistance. A fortunate compromise is the design of the rim, in which this is designed with an electrical resistance between $2.0\times10^8$ and $1.0\times10^6$. A value in this range assures that practically no contamination from the support rim is attracted and no deteriorating effect on the rim occurs. No more additive is added to the rim than what is necessary to avoid contamination of the bearing.

In a favorable development of the invention, the rim of the support disk is poly-urethane, since that can be reduced in its conductivity without damaging the material character to any great extent.

Particularly advantageous for the decreasing of the electrical resistance of the rim of the disk, is to make this from a raw material which is treated with an additive which, of itself, is electrically conductive, wherein especially favorable is an additive which is comprised of a metal powder. Particularly favorably is the use of carbon (for instance cast metal) as an additive, because this a very favorable as to price.

The design of the bearing in accord with the invention is such that the shaft of the open-end spin rotor, or at least that section thereof which rolls on the contact surface of the support disk, is provided with a cleaning groove. The achievement thereby attained is that the alternating action between rotor shaft and support disk, wherein contamination is carried from the support disk to the rotor shaft and from the support disk to the rotor shaft is interrupted in its cycle.

The cleaning groove of the rotor shaft assures that contamination from the contact surface of the support disk is immediately removed and does not remain there so long that it alters in structure to adhere as cake on the rotor shaft.

The contamination is much more likely to be removed by the cleaning groove and cast away. It is no longer possible for particles of dirt to stick for long periods on the disk rim. That previous situation finally led to the particles being spun off onto the rotor shaft. In an advantageous embodiment of the invention, the cleaning groove is helically shaped, winding itself along the shaft. The cleaning groove can, in this case, be advantageously designed in a continuous form, so that the entire axial area of the rotor shaft is regularly touched by this cleaning groove. In an advantageous embodiment of the invention, the cleaning groove can be designed in an interrupted, specified line along the appropriate longitudinal section of the rotor shaft, being continually reestablished axially on the circumferential surface of said rotor shaft. Particularly favorable is a case in which the entire axial length of the rotor shaft which touches the contact surface of the support disk is provided with the cleaning groove.

In an advantageous development of the invention, the rotor shaft is coated. This coating acts favorably on the general wear of the rotor shaft, which wear, for instance, can be caused by a belt drive or even by the contact surface of the support disks.

Favorably, the cleaning grooves will be incised into the rotor shaft after the coating of the rotor shaft is carried out, since thereby assurance is provided that the dimensions of the cleaning groove are not changed by a coating operation. In a case in reverse of the foregoing, it is of advantage to be aware that the cleaning groove cut into the rotor shaft is so dimensionally carried out that, although a coating will certainly change the said dimensions, nevertheless the desired dimensions are the final result.

In a particularly favorable embodiment of the invention, the cleaning groove possesses a depth of at least 5 $\mu$m and at the most 0.4 mm. Thereby, the goal is reached, that a reliable cleaning is effected. In a particularly advantageous embodiment, the cleaning groove has a depth between 10 $\mu$m and 0.2 mm. This depth makes sure that the contamination has sufficient room when shaft and support rim contact, and will not be rolled to cake as before. A substantial weakening of the rotor shaft is not incurred by this measure. In a further advantageous embodiment or the invention, the cleaning groove possesses a width of at least 0.1 mm and at the most, 1.0 mm. As particularly advantageous, experience showed that a range of the width of the cleaning groove would lie between 0.2 mm and 0.6 mm. An advantageous development of the of the invention is attained in that the cleaning groove has an inclination in reference to a surface line (element) of the rotor shaft. In other words, this points out that the cleaning groove is at an angle in relation to the longitudinal axis of the rotor shaft, wherein, regarded as particularly favorable, are angle values of between 10° and 70°. By the inclination of the groove, an axial thrust on the rotor shaft can be produced. This thrust can be favorably compensated for in that in the area of a first of the support disk pairs bearing the rotor shaft, the groove is inclined at an opposite angle to that in the area of a second pair of support disks. The two axial thrusts, which are respectively produced by the two bearing positions of the rotor shaft, nullify each other. In order to remove the axial thrust, it is also possible, in the area in which the rotor shaft is loaded by the support disk rim to install two cleaning grooves, which are contrarily inclined in respect to one another. Another possibility is to install a plurality of grooves, which run at right angles to the rotor axis and in the form of endless grooves, have a distance from one another of 0.1 mm to 0.5 mm.

In the following, the invention is described with the aid of drawn presentations.

BRIEF DESCRIPTION OF THE FIGURES

FIG. 5: a contact surface with a cleaning groove, the edge of which extends over the side of the contact surface, FIG. 6: a contact surface with a cleaning groove as well as a cooling groove, FIG. 7: a contact surface with a cleaning groove and additional indentations.

DETAILED DESCRIPTION

Figure 1:
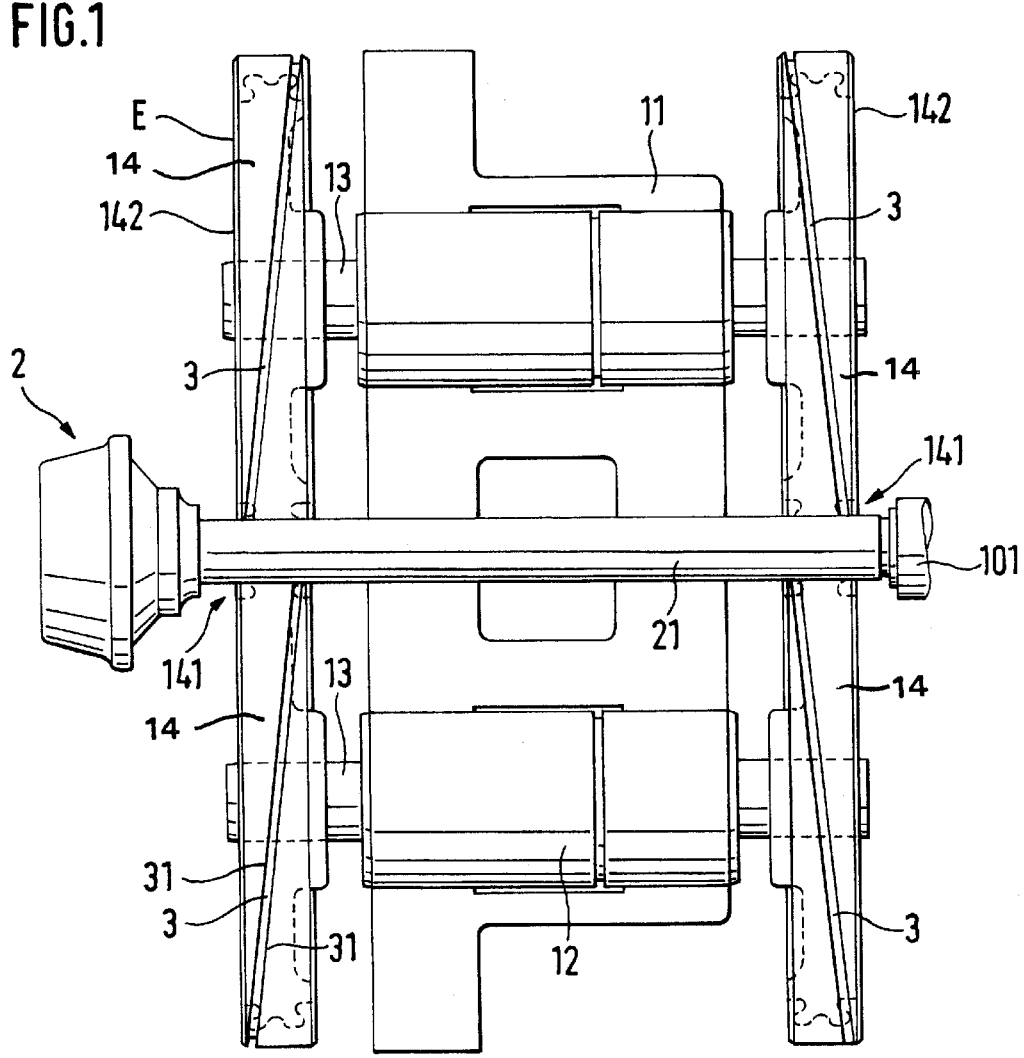
FIG. 1: a principle presentation of a bearing for an open-end spin rotor in accord with the invention.

Reference will now be made in detail to the presently preferred embodiments of the invention, one or more examples of which are illustrated in the drawings. Each example is provided by way of explanation of the invention, and not meant as a limitation of the invention.

FIG. 1 shows the principle view of a bearing for an open-end spin rotor, as these are found installed in many cases. The bearing is comprised essentially of a bearing block 11 which carries the support disk bearings. The support disks bearings 12 each carry a shaft 13, each of which shafts are press fitted to a support disk 14. The support disks form, respectively, two disk pairs, so that two V-shaped notches 141 are formed between them. The support disks 14 carry the rotor shaft 21 of the open-end spin rotor 2.

If the open-end spin rotor, for example, is driven by a belt drive, it rolls in the said V-shaped notch 141 on the support disks 14. This puts the support disks into rotation. The support disks 14 are provided with a cleaning groove 3. By the rotation of the support disks 14, the said cleaning groove 3 meanders with its edges 31 back and forth along the contact line of the rotor shaft 21. At a still-stand of the rotor shaft 21, and the support disks 14 in rotation (a theoretical situation) then the edges 31 of the said cleaning groove 3 would axially scrape along the rotor shaft 21. The cleaning groove is actually installed in the rim 51 (see FIG. 8) of each said disks in the form of an endless groove, which runs from the one side 142 of the support disk 14 and back to the other side 142 (see FIG. 2). In this way, the same area, in which the rotor shaft 21 comes into contact with the rim 51 of the support disk 14, is touched once by an edge 31 of the cleaning groove 3. Since the running of the rotor shaft 21 on the support disks 14 does not proceed without slippage, this assures that the edge 31 strokes not only every position of the rotor shaft in an axial direction, but also that an axial rubbing on the rotor shaft occurs, since no perfect rolling relationships between the rotor shaft 21 and the support disks 14 happen. By means of the slippage between the support disk 14 and the rotor shaft 21, the edge 31 of the cleaning groove scrapes also along the rotor shaft 21 in an axial direction, whereby, contaminating materials are removed. These collect in the cleaning groove and are removed therefrom finally in the area of the V-notch 141.

The bearing arrangement of FIG. 1 possesses on all four support disks 14, a cleaning groove 3. One can consider, however, that per V-notch 141 only one support disk 14 carries the load of a cleaning groove 3. Thus, it is advantageous to have that same support disk carry the lighter load of rotational relationships. By this means, the weakening of the rim 143, which this experiences through the incision of the cleaning groove 3, is somewhat compensated for. Advantageously, that support disk 14, which turns outwardly from the V-notch 141, possesses the cleaning groove 3. As is made clear in FIG. 1, the cleaning grooves 3 of all support disks 14, are partially inclined (see FIG. 2, angle α) in relation to the plane E, which is disposed parallel to the side 142 of the disks 14.

This inclination of the cleaning groove 3 can induce an axial thrust on the rotating spin rotor which turns with it. This axial thrust is not necessarily desirable. Therefore, the inclinations of the cleaning groove 3 of a support disk pair, which form a V-notch, are so arranged, that their combined thrust actions are compensating. A like situation is obtained, if only, respectively, one of the support disks per V-notch 141 possesses a cleaning groove 3. In the interest, however, of completeness, it should be said that the shafts 13 are not designed to be parallel to one another, but rather skewed, so that an axial thrust is generated by the said support disks 14. The reaction thereof is absorbed in known fashion by an axial bearing 101. This can be a pivot bearing or, as shown in the embodiment of FIG. 1, in the form of an aerostatic thrust bearing.

Figure 2:
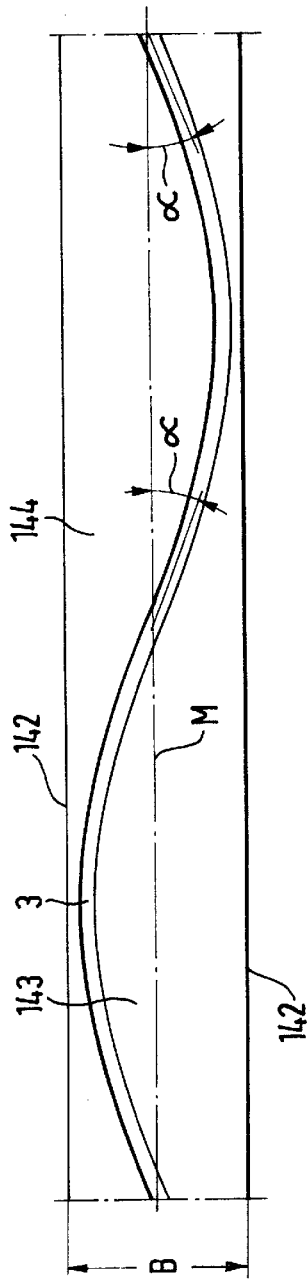
FIG. 2: the contact surface of a support disk with a cleaning groove presented as a geometric development in the plane of the drawing.

FIGS. 2 to 7 show, respectively, the contact surface of a supporting disk, as a geometrical development of a circumferential surface presented in a plane. FIG. 2 shows the development of a contact surface, wherein the contact surface 144 of the rim 143 possesses a cleaning groove 3, which is designed as endless and partially of helical shape, running from one side 142 to the other side 142 of the support disk 14. The cleaning groove 3 has, in relation to the mid-axis M, each in accord with the design of the support disk 14, an angle α of inclination between 2° and 10°. In the area in which the cleaning groove 3 approaches the edge 142 of the contact surface 144, the said angle α becomes 0°, since otherwise, a return of the cleaning groove 3 would not be possible. The return so acts, that an endless cleaning groove 3 is possible. In the area of the edge 142, the cleaning groove is brought very close to the edge. Between the edge 31 of the cleaning groove 3 to the edge 142 of the support disk, is still found the rim 143, so that the support disk 14 in proximity to the said edge possesses a circumferential, continuous, uninterrupted, affixed rim 143. Thereby, impacts on the rotor shaft 21, when this rolls over the rim 143 are avoided. The cleaning groove 3 has a width of 1.0 mm and the groove depth, likewise of 1.0 mm. This assures in the embodiment of FIG. 2, that not only a good cleaning of the rotor shaft 21 of contamination, but also a removal of dirt particles from the rotor shaft 21. These dirt particles can then, operation leave the support disk by centrifugal force and are expelled from the area of the rotor bearing.

The depth of 1.0 mm to 2.0 mm assures at the same time, also a cooling effect on the support disk rim 143. The width B of the contact surface 144 measures 10.0 mm, so that with a groove width of 1.0 mm, a weakening of the rim by about 10% takes place. In particular bearing practices, the cleaning groove can have a much more restricted width, so that the interruption of the contact surface 144, observed at right angles to the edge 142, will be much less than 10%. A favorable width is, in this case, set at a 7% interruption. Since the cleaning groove 3 in the area of the middle line M has effectively a greater width, this must be taken into consideration in the design of the cleaning groove 3, if a minimal interruption of the contact surface is desired. The width of the cleaning groove may then possibly be designed at a smaller figure.

Figure 3:
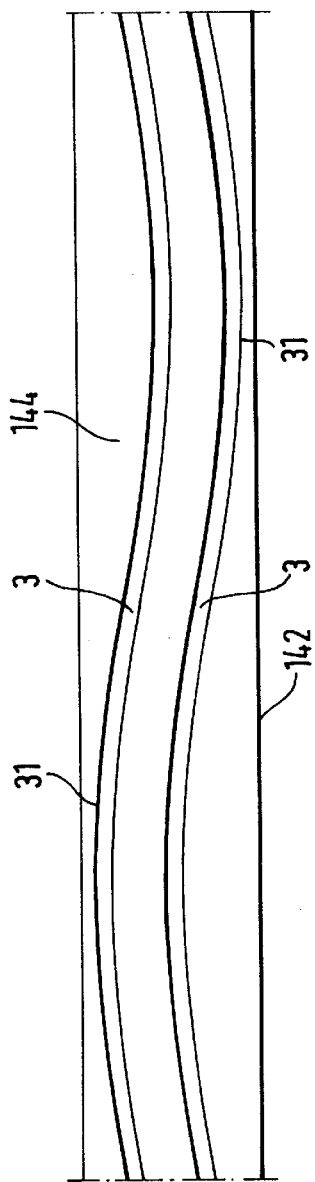
FIG. 3: the contact surface with two cleaning grooves running in parallel.

FIG. 3 shows a contact surface 144 of a support disk 14 for a bearing, in accord with the invention, which surface is provided with cleaning grooves 3. In their run, the cleaning grooves 3 of FIG. 3 resemble the cleaning grooves 3 of FIG.

2. The departure lies only in that two parallel cleaning grooves 3 are apportioned over the width of the contact surface 144 of FIG. 3. This has the result, that the angle α is about only half as large as that shown in FIG. 2. The inclination of each of the two cleaning grooves 3 is the same. The cleaning grooves 3 are indeed inclined with a smaller angle in relation to a circumferential line about the support disk, however, this embodiment possesses a more favorable apportionment between the areas, which areas are cut through by one groove and other areas in which no groove runs. This is made clear by reference between FIG. 2 and FIG. 3. The cleaning grooves 3 of FIG. 3 are narrower in design than the cleaning grooves 3 in FIG. 2. The width showed, in this case, only 0.4 mm, so that the interruption of the contact surface 144, seen at a right angle to edge 142, is even less than in the case of FIG. 2. The groove edges 31, which run by edges 142 of the support disk, run also, as shown in FIG. 2, in such a way, that a rim surface portion 143 remains between groove edge 31 and the support disk edge 142. This assures, as illustrated in FIG. 1, a quiet run of the spin-rotor 2 on the support disk 14. The depth of the cleaning grooves 3 measures in this embodiment only 0.3 mm.

Figure 4:
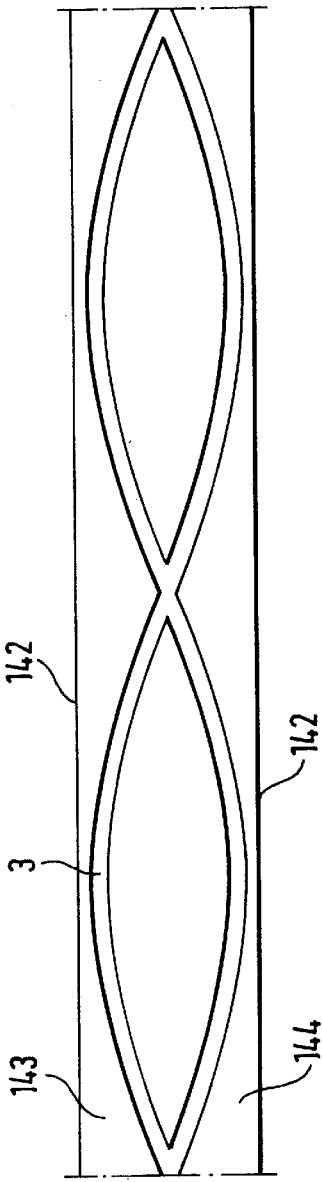
FIG. 4: a contact surface of a support disk with two cleaning grooves which cross one another.

FIG. 4 shows another embodiment of a rim 143 of a support disk, on which the contact surface 144, similarly to FIG. 3, is separated by two cleaning grooves, these, however, being somewhat different, in that they are so designed that both cleaning grooves run back and forth from edge 142 to the other edge 142. Each of the two cleaning grooves possesses also the same geometrical relationships as the cleaning groove 3 of FIG. 2. The two cleaning grooves 3 of FIG. 4 are principally, in relation to the circumference of the supporting disk off set from one another by an angle of 180°. This has the result, that the two cleaning grooves 3 of FIG. 4 cross themselves on the contact surface twice. One of the crossing points is to be seen in the middle of FIG. 4 and the other crossing point is visible partially on the left side of FIG. 4 and partially on the right side. In order not too cause too great a weakening of the contact surface at the crossings, the two cleaning grooves 3 of FIG. 4 are respectively only 0.2 mm wide. For the sake of clarity, the grooves in all the figure presentations have been made wider.

FIG. 5 shows an embodiment of a cleaning groove 3, similar to that of FIG. 2. Principally, both groove edges 31 extend, alternately, over the edge 142 of the contact surface 144. By means of this embodiment, the goal can be arrived at, that the angle α, other things being equal, can be designed larger than in FIG. 2. Thereby, since always only one groove edge 31 at a time goes over the edge 142 of the support disk, a smooth rolling over this point is possible for the rotor shaft. The cleaning action of the groove edge 31 extends itself in an axial direction, over a greater length than in the example of FIG. 2. This, then can be necessary if an especially thick and tightly bound contamination layer is to be feared during the operation. The depth of the cleaning groove 3 of FIG. 5 is 0.2 mm, since this is only slightly weakening at the critical position, where edge 31 runs over the edge 142.

In the case of the embodiment of FIG. 6, the contact surface 144 possesses two grooves, of which one is the cleaning groove 3, while the other is a cooling groove 4. This cooling groove 4, in the embodiment of FIG. 6, is arranged in the classic manner, i.e. customary in the present state of the technology, in the middle of the contact surface 144. The cooling groove has a width of 1.0 mm and a depth equal thereto.

The cleaning groove 3 is, in regard to is shape, so designed, as to be similar to that of FIG. 2. It crosses the cooling groove 4 at two points. The cleaning groove 3 can, in the embodiment of FIG. 6, be designed to be exceptionally narrow. That is, with a width of 0.2 mm and likewise, with a very small depth, namely, 0.2 mm, since no heat removal action is expected from the cleaning groove 3. In addition, a small depth and width of the cleaning groove 3 brings about a reliable function, since the rolling over at the crossing point of the two grooves by the rotor shaft is made more smoothly by a lessened depth of the cleaning groove 3. At the cross-over point, the contact surface 144 undergoes the greatest interruption in the rim 143 by the grooves. In the embodiment example in FIG. 6, the interruption is advantageously, in spite of this, still less than 40%.

FIG. 7 shows a combination of cooling groove and cleaning groove 3 in which no possibly critical cross-over point between the cooling groove and the cleaning groove is present. The cooling groove, in the embodiment in FIG. 7, is designed in the form of incisions 41, which at their beginning 410 and at their end 411 blend without steps into the contact surface 144. The transition area can respectively, measure between about 2.0 mm and 120 mm. Further, the incisions 41 have the dimensions of the cooling groove 4 as to depth and width. The cleaning groove 3 can be made wider than was done in the embodiment example shown in FIG. 6, since the critical crossings of the cleaning groove and the cooling groove have been avoided, as is seen in FIG. 7. By formulating the width of the incisions 41 and the cleaning groove at respectively 1.0 mm, it can nevertheless be attained that the interruption of the contact surface 144, at right angles to the edge 142, is held at less than 25%.

Figure 8:
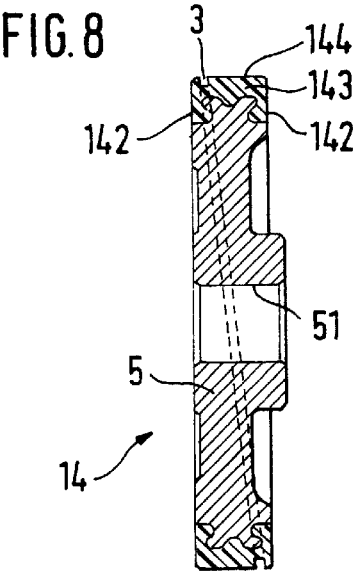
FIG. 8: a section through a support disk for a bearing in accord with the invention, with the cleaning groove also in sectional view.

FIG. 8 shows a cross-section through a support disk with a cleaning groove 3 in the rim 143, which rim, on its outer circumference, forms the contact surface 144. The support disk is comprised of a basic body 5, which, for example, is made of pressure cast aluminum. The support disk 14 possesses in it center, a boring 51, allowing it to be installed on the shaft 13 of a support disk bearing by means of press fit (see FIG. 1.) In accord with the section view, the cleaning groove 3 crosses from the left edge 142 to the right edge 142 of the support disk.

Figure 9:
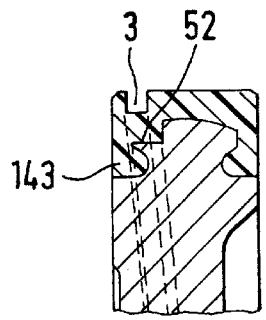
FIG. 9: a partial sectional view of a support disk, with a cleaning groove in which the basic body, on the circumferential side, possesses an indentation, which follows the course of the cleaning groove.

In the area of the transition between the basic body 5 and the rim 143, the aluminum circumference of the basic body 5 is specially treated, so that an improved adherence can assured between the basic body 5 and the rim 143. The known basic bodies are so designed that in the area of a centrally placed cooling groove, which is not shown here in FIG. 8, a sufficient thickness of the rim 143 material is provided. The cleaning groove 3, which is to be installed and which runs over the entire outer circumference, that is, over the entire width of the rim 143, must also receive attention, so that a sufficient thickness of rim material is furnished. In order to assure this, in the case of the basic body 5 of FIG. 9, provision was made that this basic body, on its circumferential side, has a recess 52, so that, as a result of this, between the cleaning groove 3 and the basic body 5, a sufficient material thickness remains. This recess 52 also has a very similar course to the overlaying cleaning groove 3. In the making of such a support disk, provision is also made that, in order to facilitate the manufacture of the cleaning groove, there is placed a marking on the support disk, so that, for instance, upon cutting in the cleaning groove 3 into the rim 143, the said cleaning groove 3 can be located exactly above the recess 42. The same serves, where required, for an additional cooling groove.

Figure 10:
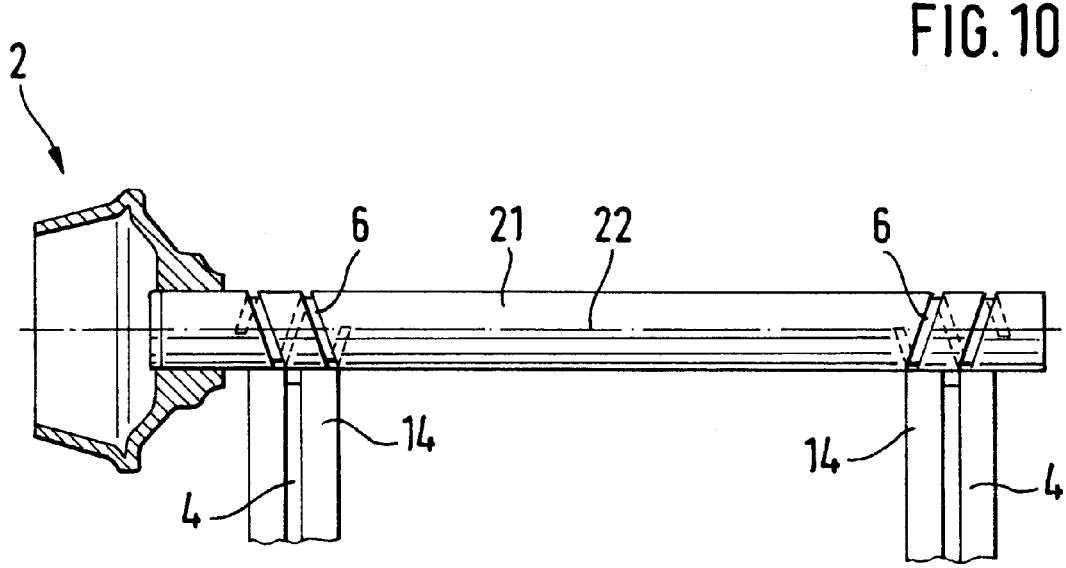
FIG. 10: an open-end spin rotor with its rotor shaft and cleaning grooves.

FIG. 10 shows an open-end spin rotor 2 for a bearing design in accord with the invention. FIG. 10 shows the positioning of the rotor shaft 21 on two support disks 14.

These said disks are provided with a middle cooling groove 4. In order to prevent dust or dirt particles from agglomerating on the rotor shaft 21, this possesses, in the area wherein it makes contact with the support disks 14, a cleaning groove 6 which in a winding pattern, helically surrounds the shaft. The cleaning grooves 6 are designed with an inclination to the axis 22 of the shaft 21, which inclination is at such a pitch angle, that the grooves 6 make a complete encirclement of the shaft 21 in the area in which they touch the support disk 14.

The said cleaning grooves 6 do not extend outside of the contact area of the support disk 14. Beyond this zone, the said grooves are not required for cleaning or removal of contamination from the rotor shaft 21. The cleaning groove 6 is angled, relative to the axis 22 of the rotor shaft, about 15°.

The cleaning groove 6 is inclined in a reverse direction, in the area of one support disk 14, in comparison to the other support disk 14. By this means, the situation is attained, in which no axial thrust is exerted on the rotor shaft 21. The cleaning groove can, according to the design, be inclined between 10° and 70° to a line vertical to the axis of shaft 21.

Figure 11:
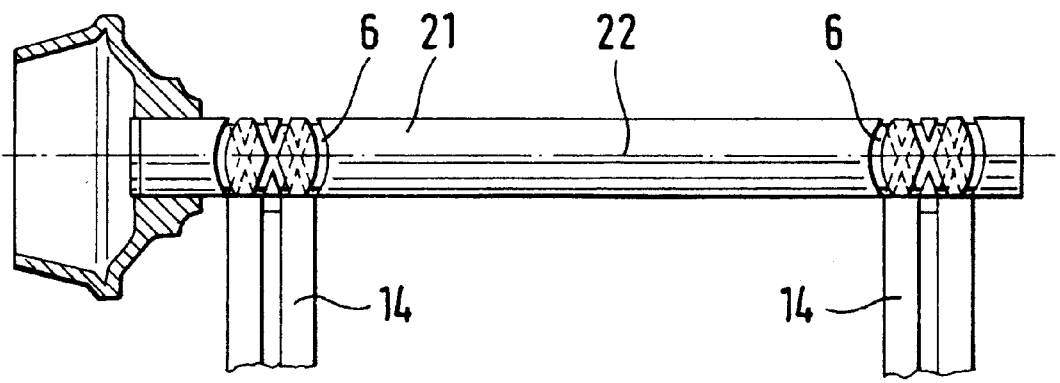
FIG. 11: an open-end spin rotor with shaft, in which the shaft possesses cleaning grooves, which exhibit a return spiral.

FIG. 11 shows a rotor shaft 21, in which the cleaning groove 3 is depicted as a kind of reversely wound groove There is also, in the area of each individual support disk 14 a cleaning groove 6 inclined in one direction to the shaft axis 22 as well as one inclined in a reverse direction. That is, each single bearing position is free of axial thrust. The ends of the cleaning grooves 6 extend in in-and-out plaited fashion, so that an endless groove is obtained. The cleaning groove of FIG. 10 possesses a width of 0.3 mm. Its depth is 0.05 mm (50 $\mu$m).

In accord with one of the present embodiments of the invention, the rim is comprised of a material with an electrical resistance which is less than $1.0 \times 10^9$ Ohms. Independently of a cleaning groove, it can thus be prevented that dirt particulate on the rotor shaft cakes itself there. The rim 143 of a support disk 14 is, for this reason, made of polyurethane which, by means of additives, has a diminished electrical resistance. By the addition of more or less additives, or by adding special additives, for instance, metal powder, the electrical resistance can be brought down to a particularly favorable value between $2.0 \times 10^8$ Ohms and $1.0 \times 10^6$ Ohms. The design of the support disk rim 143, in accord with the present invention, makes it possible to dispense with certain measures, such as, for instance, a cleaning groove in the rim or a cleaning groove in the rotor shaft. The rim in accord with the invention, with an electrical resistance of less than $1.0 \times 10^9$ Ohms can, obviously, be installed in combination with a cleaning groove or cooling groove. It is also possible, to combine a rim of that type for a support disk even with the other two inventions.

What is claimed is:

1. A bearing arrangement for rotatably supporting a rotor shaft of an open end spin rotor, comprising pairs of support disks arranged so as to define a notch in which said rotor shaft is rotatably supported, each of said support disks further comprising a basic body and a rim fitted thereon, said rim defining an outer circumferential contact surface against which said rotor shaft rests; and at least one cleaning groove defined in said contact surface of at least one said disk of each said pair of disks, said cleaning groove comprising a continuous endless groove defined between continuous circumferential edge sections of said contact surface and having a shape and angular configuration so as not to coincide with a middle axis of said contact surface to cause a cleaning of said rotor shaft as said rotor shaft rotates in said notch against said contact surfaces.

2. The bearing arrangement as in claim 1, wherein at least one said cleaning groove is provided in each said disk.

3. The bearing arrangement as in 1, wherein said cleaning groove is defined at a non-parallel angle with respect to said middle axis of said contact surface.

4. The bearing arrangement as in claim 3, wherein said cleaning groove crosses said middle axis at least once.

5. The bearing arrangement as in claim 1, wherein said cleaning groove has a width between about 0.2 mm and about 2.0 mm.

6. The bearing arrangement as in claim 1, wherein said cleaning groove has a depth between about 0.2 mm and about 2.0 mm.

7. The bearing arrangement as in claim 1, wherein said contact surface is defined by sides of said disk, said cleaning groove disposed in said contact surface around a circumference of said disk in a non-parallel configuration with respect to a middle axis of said contact surface such that an unbroken run of said contact surface is defined between each said side and said groove.

8. The bearing arrangement as in claim 7, wherein said cleaning groove is continuous and crosses said middle axis at least twice.

9. The bearing arrangement as in claim 1, wherein said contact surface is defined by sides of said disk and said cleaning groove is defined by edges, said cleaning groove disposed in said contact surface around a circumference of said disk in a non-parallel configuration with respect to a middle axis of said contact surface such that at least one of said groove edges extends beyond one of said sides along at least a circumferential portion thereof.

10. The bearing arrangement as in claim 1, wherein said contact surface is interrupted by said cleaning groove in an axial direction with respect to a rotational axis of said disk by no more than about 40%.

11. The bearing arrangement as in claim 10, wherein said contact surface is interrupted between about 7% to about 25%.

12. The bearing arrangement as in claim 10, comprising no more than three said cleaning grooves, a combined interruption of said cleaning grooves not exceeding about 40%.

13. The bearing arrangement as in claim 1, further comprising a recess defined along an outer circumferential surface of said body radially inward of said rim and into which said rim is disposed, said recess having a shape corresponding generally to that of said cleaning groove so that the radial thickness of said rim is generally constant across said contact surface.

14. The bearing arrangement as in claim 1, wherein said cleaning groove has one of a U-shaped or V-shaped cross sectional profile.

15. The bearing arrangement as in claim 1, wherein said rim is formed of a plastic material possessing an electrical resistance of less than about $1.0 \times 10^9$ Ohms at least in a zone proximal to said contact surface.

16. A bearing arrangement for rotatably supporting a rotor shaft of an open end spin rotor, comprising pairs of support disks arranged so as to define a notch in which said rotor shaft is rotatably supported, each of said support disks further comprising a basic body and a rim fitted thereon, said rim defining an outer circumferential contact surface against which said rotor shaft rests; and at least one cleaning groove defined in said contact surface of at least one said disk of each said pair of disks, said cleaning groove having a shape and dimensions to cause a cleaning of said rotor shaft as said rotor shaft rotates in said notch against said contact surfaces;

and wherein said contact surface comprises at least two said cleaning grooves.

17. The bearing arrangement as in claim 16, wherein said cleaning grooves run parallel to each other on said contact surface.

18. The bearing arrangement as in claim 16, wherein said cleaning grooves cross each other on said contact surface.

19. A bearing arrangement for rotatably supporting a rotor shaft of an open end spin rotor, comprising pairs of support disks arranged so as to define a notch in which said rotor shaft is rotatable supported, each of said support disks further comprising a basic body and a rim fitted thereon, said rim defining an outer circumferential contact surface against which said rotor shaft rests; and at least one cleaning groove defined in said contact surface of at least one said disk of each said pair of disks, said cleaning groove having a shape and dimensions to cause a cleaning of said rotor shaft as said rotor shaft rotates in said notch against said contact surfaces; and further comprising at least one cooling groove defined in said contact surface, said cleaning groove defined in a non-parallel configuration with respect to said cooling groove.

20. The bearing arrangement as in claim 19, wherein said cooling groove is defined around said disk at a right angle to a rotational axis of said disk.

21. The bearing arrangement as in claim 19, wherein said cooling groove is discontinuous around said disk.

22. The bearing arrangement as in claim 21, wherein said cooling groove comprises segments disposed on opposite sides of said cleaning groove, said segments defined at a right angle to a rotational axis of said disk.

23. A bearing arrangement for rotatable supporting a rotor shaft of an open end spin rotor, comprising pairs of support disks arranged so as to define a notch in which said rotor shaft is rotatably supported, each of said support disks further comprising a basic body and a rim fitted thereon, said rim defining an outer circumferential contact surface against which said rotor shaft rests; and at least one cleaning groove defined in said contact surface of at least one said disk of each said pair of disks, said cleaning groove having a shape and dimensions to cause a cleaning of said rotor shaft as said rotor shaft rotates in said notch against said contact surfaces; and further comprising at least one cooling groove defined in said contact surface, said cleaning groove defined in a non-parallel configuration with respect to said cooling groove, said cleaning groove having a width less than that of said cooling groove.

24. A bearing arrangement for rotatably supporting a rotor shaft of an open end spin rotor, comprising pairs of support disks arranged so as to define a notch in which said rotor shaft is rotatably supported, each of said support disks further comprising a basic body and a rim fitted thereon, said rim defining an outer circumferential contact surface against which said rotor shaft rests; and at least one cleaning groove defined in said rotor shaft along at least one longitudinal section thereof which contacts said contact surfaces; and wherein said cleaning groove has a depth between about 5 $\mu$m and 0.4 mm.

25. The bearing arrangement as in claim 24, wherein said cleaning groove comprises a generally helical groove encircling said rotor shaft.

26. The bearing arrangement as in claim 24, wherein said depth is between about 10 $\mu$m and about 0.2 mm.

27. The bearing arrangement as in claim 24, wherein said cleaning groove has a width between about 0.1 mm and about 1.0 mm.

28. The bearing arrangement as in claim 24, wherein said cleaning groove has a width between about 0.2 mm and 0.6 mm.

29. The bearing arrangement as in claim 24, wherein said cleaning groove is angled with respect to an axis of said rotor shaft between about 10 degrees to about 45 degrees.

30. A bearing arrangement for rotatable supporting a rotor shaft of an open end spin rotor, comprising pairs of support disks arranged so as to define a notch in which said rotor shaft is rotatable supported, each of said support-disks further comprising a basic body and a rim fitted thereon, said rim defining an outer circumferential contact surface against which said rotor shaft rests; and at least one cleaning groove defined in said rotor shaft along at least one longitudinal section thereof which contacts said contact surfaces; and wherein said rotor shaft comprises two said cleaning grooves such that a first said cleaning groove is provided along each longitudinal section of said rotor shaft in contact with said contact surfaces of each said pair of said support disks, each of said cleaning grooves angled with respect to an axis of said rotor shaft opposite from the other said cleaning groove.

31. The bearing arrangement as in claim 30, further comprising at least one additional cleaning groove provided at each said longitudinal section of said rotor shaft, said additional cleaning grooves angled at a generally opposite angle relative to said first cleaning grooves and crossing said first cleaning grooves.

* * * * *